Oct. 25, 1938.　　D. D. AREHART　　2,134,351
MOTOR VEHICLE TRAILER
Filed Oct. 19, 1936　　4 Sheets-Sheet 1

INVENTOR
DAVID D. AREHART
BY *Whittemore Hulbert & Belknap*
ATTORNEYS

Oct. 25, 1938.  D. D. AREHART  2,134,351
MOTOR VEHICLE TRAILER
Filed Oct. 19, 1936  4 Sheets-Sheet 2

INVENTOR
DAVID D. AREHART
BY Whittemore Hulbert & Belknap
ATTORNEYS

Oct. 25, 1938.　　　D. D. AREHART　　　2,134,351
MOTOR VEHICLE TRAILER
Filed Oct. 19, 1936　　　4 Sheets-Sheet 3
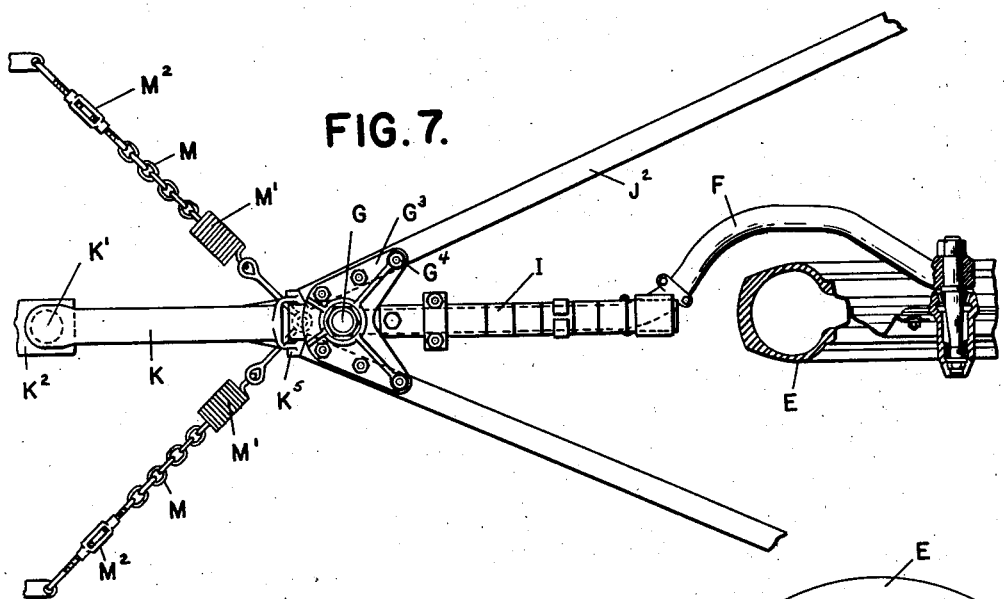
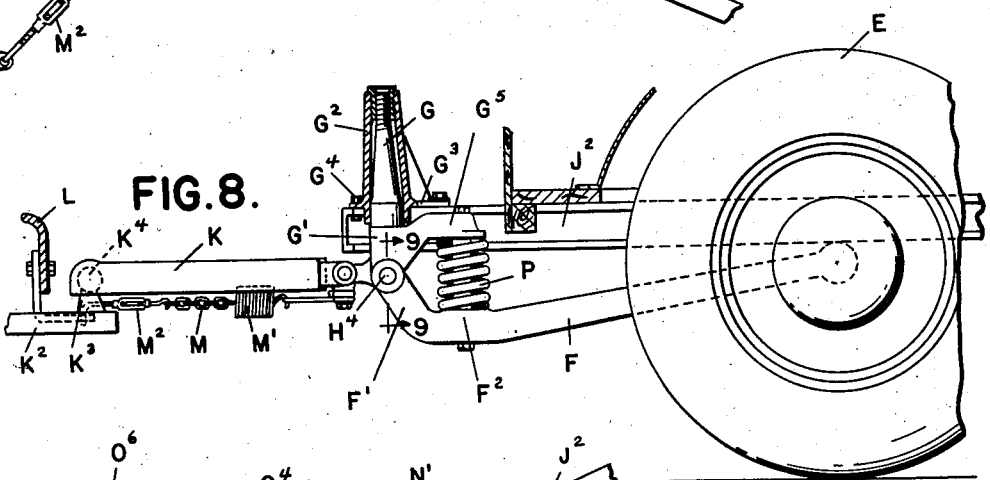
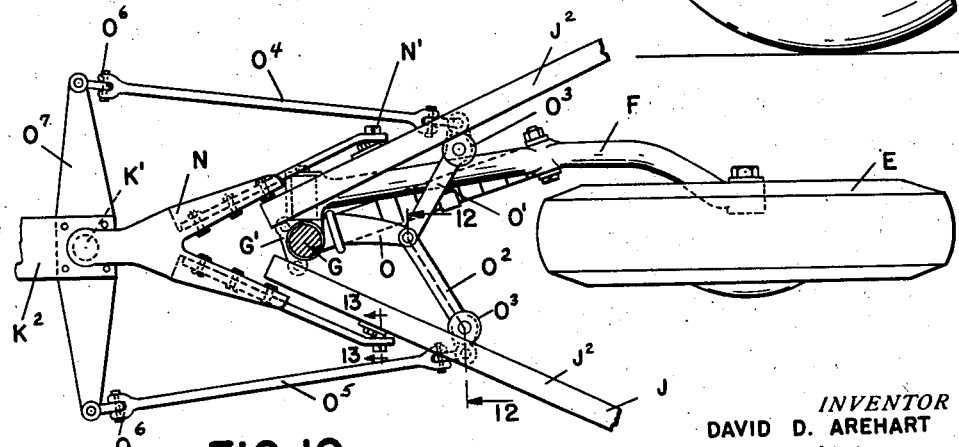
INVENTOR
DAVID D. AREHART
ATTORNEYS Oct. 25, 1938.   D. D. AREHART   2,134,351
MOTOR VEHICLE TRAILER
Filed Oct. 19, 1936   4 Sheets-Sheet 4

*INVENTOR*
DAVID D. AREHART
BY *Whittemore Hulbert & Belknap*
*ATTORNEYS*

Patented Oct. 25, 1938

2,134,351

UNITED STATES PATENT OFFICE 2,134,351

MOTOR VEHICLE TRAILER

David D. Arehart, Flint, Mich., assignor to Palace Travel Coach Corporation, Flint, Mich., a corporation of Michigan Application October 19, 1936, Serial No. 106,475

9 Claims. (Cl. 280—33.5)

The invention relates to motor vehicle trailers and has more particular reference to constructions normally supported on more than two wheels, such for instance as three wheels. Among the objects of the invention are: first, to obtain easy riding qualities; second, to improve the steering of the trailer so that it will more accurately follow the path of the tractor; third, to facilitate backing wherever this is necessary. With these and other objects in view, the invention consists in the construction as hereinafter set forth.

In the drawings:

Figure 7 is a view similar to Figure 4 showing a modified construction;

Figure 8 is a view similar to Figures 3 and 5 showing still another modification;

Figure 10 is a plan view of Figure 11;

Automobile trailers when in transit are usually supported on only two wheels journaled on a single axle which is arranged adjacent to the center of gravity, the draft rigging being depended upon for stability. Such a construction cannot have as easy riding qualities as one supported on a plurality of axles with spaced spring supports for the body of the car. With my improved construction a third wheel is provided, preferably at the front of the trailer, and this is so connected with the draft rigging as to be automatically turned in correspondence with any change in direction of the tractor. As shown and as preferably constructed, this third wheel is of the caster type its swivel connection with the trailer body being in advance of its axis of rotation. This facilitates the steering of the trailer when it is traveling forward, but renders backing more difficult. I have, therefore, devised a construction which while using a caster wheel can be readily steered when driven backward. This is accomplished through the construction of the draft rigging and its combination with the caster wheel as hereinafter described. A further feature of my improvement is the spring suspension of the trailer body upon the caster wheel which cushions vertical shocks without interference with freedom for lateral turning about the swivel axis.

Figures 1, 2:
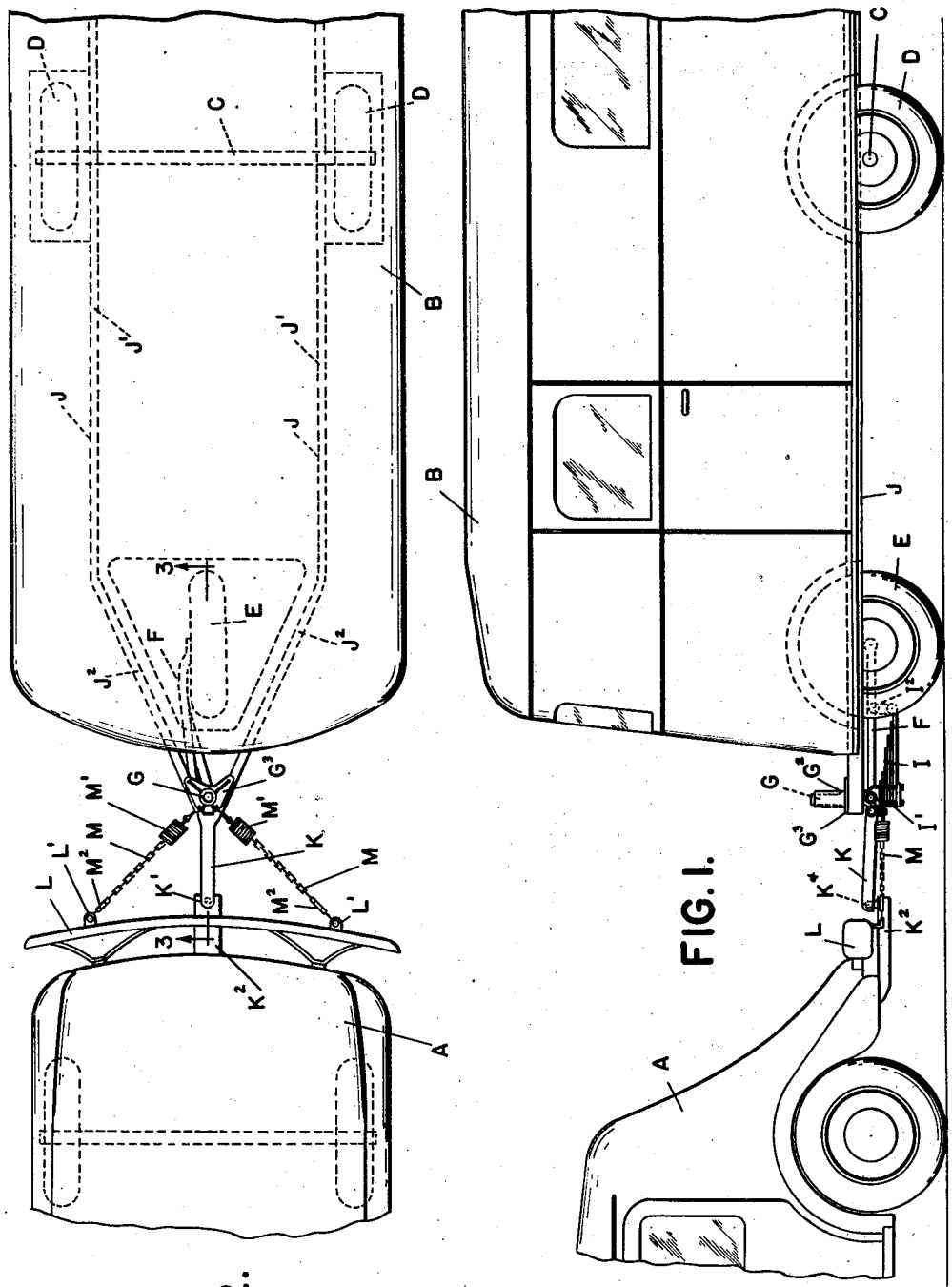
Figure 1 is a side elevation showing a portion of a tractor to which my improved trailer is coupled.
Figure 2 is a plan view thereof.
Figure 3:
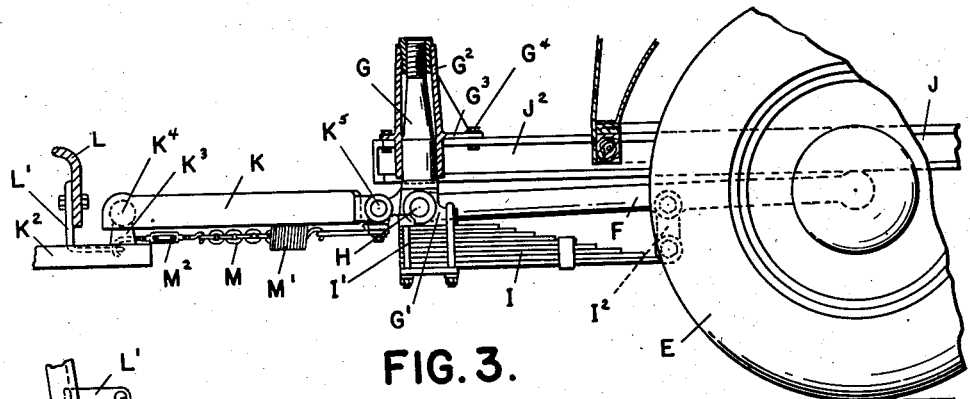
Figure 3 is a vertical section showing the draft connection for the trailer and the third wheel.
Figure 5:
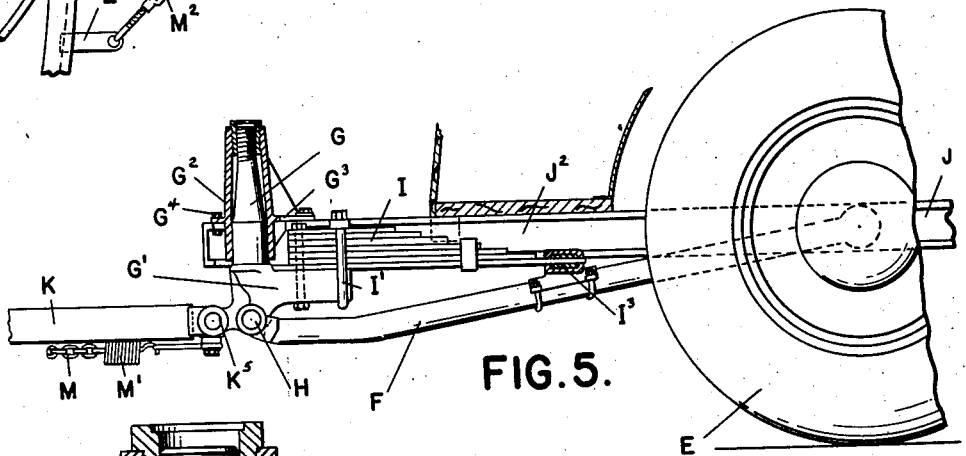
Figure 5 is a view similar to Figure 3 showing a modified construction.
Figure 6:
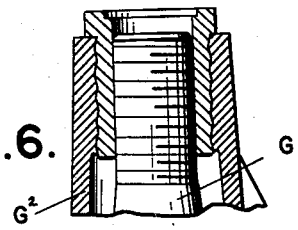
Figure 6 is a vertical section showing the manner of attaching the king-pin.
Figure 11:
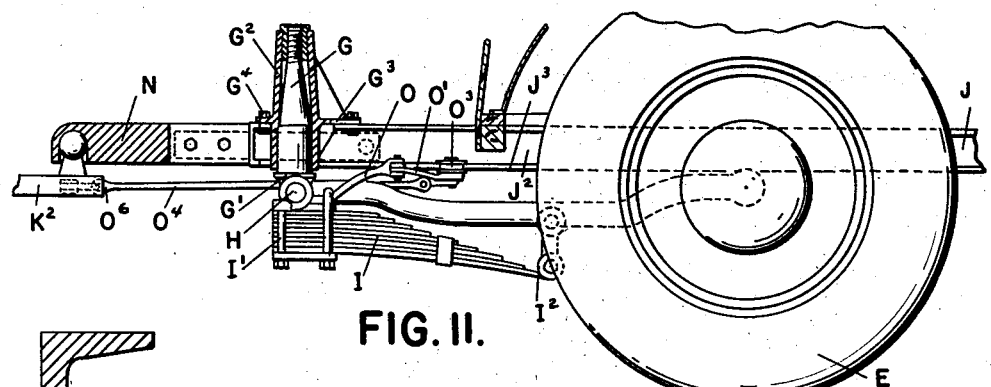
Figure 11 is a vertical longitudinal section illustrating a different form of draft rigging.
Figure 12:
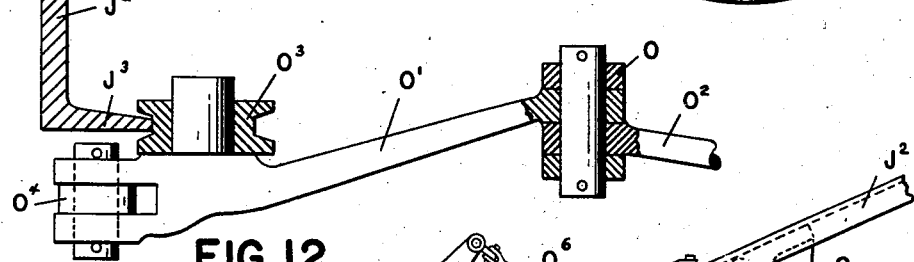
Figure 12 is a section on line 12—12 of Figure 10.

In detail, A represents the tractor which may be an automobile or any other type of vehicle. B is the trailer body which in its rear portion is supported upon an axle C and a pair of ground wheels D, any suitable type of spring suspension (not shown) being interposed between the axle and trailer body. E is the third wheel which is beneath the forward portion of the trailer body and is connected thereto through the forwardly extending arm F and king-pin G. To permit of relative vertical movement of the wheel D and body B, the arm F is connected to the king-pin by a horizontal pivot pin H which projects laterally from the head G' at the base of said king-pin. There is also a spring suspension which as shown in Figures 3, 5 and 11 is formed of leaf springs I clipped or otherwise secured at I' to the head G'. The outer end of this spring is connected to the arm F by suitable means such as a shackle I², Figures 3 and 11, or the bearing I³, Figure 5, which slidably engages one leaf on the spring. The king-pin G is swiveled in a bearing G² which through the flange G³ and bolts G⁴ is rigidly secured to the sills J for supporting the trailer body. These sills, as shown in Figures 1 and 2, have parallel portions J' extending the greater part of the length of the body and oblique portions J² extending towards each other and having their forward ends connected to the bearing G slightly in advance of the body B.

The draft rigging between the tractor and trailer comprises a draft bar K, the forward end of which is pivotally attached at K' to a suitable bracket member K² secured in any suitable manner to the tractor. The pivotal connection K' is preferably a universal joint permitting of the swinging of said draft bar in both vertical and horizontal planes. Thus as shown the bracket K² has mounted thereon a post member K³ having a spherical upper end $K^4$ for engaging a spherical socket in the draft bar. The rear end of the draft bar is connected by a pivot pin $K^5$ to the head $G'$, this permitting of relative vertical oscillation of the bar $K$ and arm $F$, but holding these members in alignment in a horizontal plane. Thus any change in direction of movement of the tractor will cause a lateral movement of the draft bar $K$ and arm $F$ aligned therewith which will turn the wheel $E$ about a vertical axis intersecting its axis of rotation. This will also move the king-pin $G$ and bearing $G^2$ laterally but not to the same extent, inasmuch as the pin is in rear of the draft bar. Where, as shown, the pivotal connection $K'$ is in rear of the bumper $L$, it is located a considerable distance in back of the tractor rear axle. Thus where the tractor is turned in one direction the pivotal connection $K'$ will be swung in the opposite direction which will turn the plane of the wheel $E$ so that the forward end of the trailer will be directed outward or opposite to the direction of turning of the tractor. Also, the lateral movement of the king-pin $G$ will turn the longitudinal axis of the body slightly outward but to a lesser extent. This will assist in causing the trailer to follow the path of the tractor instead of cutting the corner.

The construction as thus far described will operate satisfactorily as long as the movement is in a forward direction. If, however, the tractor is backed, then there will be a tendency for the draft bar $K$ to swing about the pivotal connection $K'$ permitting the wheel $E$ to travel either one side or the other of the desired direction. This tendency I have avoided by the following construction:

On each side of the draft bar $K$ are arranged diagonally extending draft connections $M$ which at their forward ends are suitably attached to the tractor as to brackets $L'$ on the bumper $L$, while at their rear ends they are connected to the head $G'$. These draft connections may be formed of chains but include a resilient element, such as the spring $M'$, and also preferably a turnbuckle $M^2$ for properly adjusting the length. The tension of the spring $M'$ is sufficient to normally hold the draft bar $K$ in alignment with the longitudinal axis of the tractor and as long as the tractor is traveling in a straight line it will maintain this position. When, however, the tractor is turned the pivotal connection $K'$ will be swung outward as previously described, while the wheel $E$ because of its ground contact will be held from lateral movement. This will change the angle of the draft bar and arm $F$ which necessitates an elongation of the outer diagonal draft connection $M$ permitted by the spring $M'$ and thus these members $M$ will in no way interfere with the operation when the tractor is moving in a forward direction. On the other hand, when the tractor is backed, then tension of the springs $M'$ will initially hold the draft bar $K$ in alignment with the longitudinal axis of the tractor and will counteract any tendency in this member to swing about the pivotal connection $K'$. It is still possible to move the draft bar at an angle where this is necessary to backing into a particular location, but the tension of the springs $M'$ will constantly act to restore the draft bar to its normal position.

Figure 4:
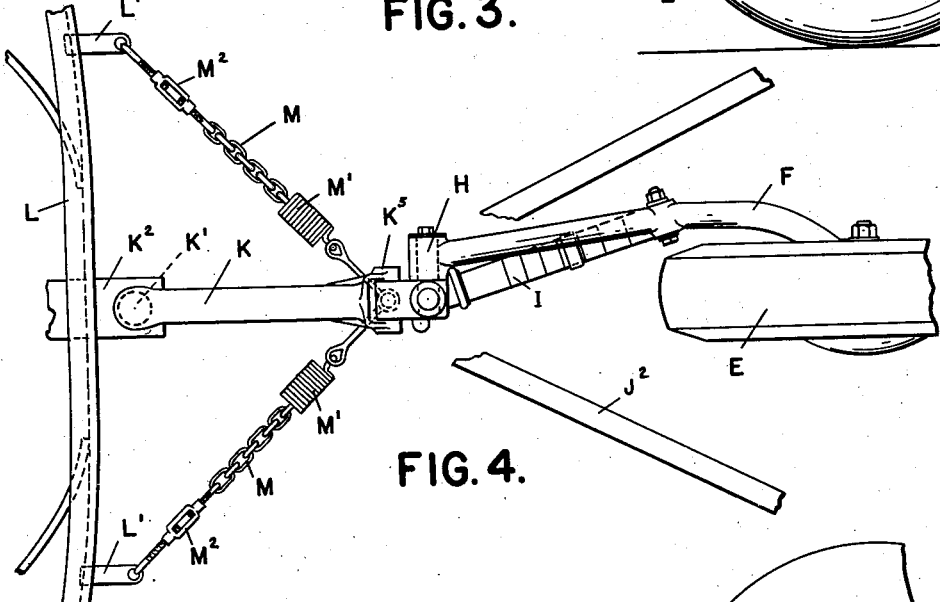
Figure 4 is a plan view of Figure 3.

Instead of the draft connection shown in Figures 2, 4 and 7, I may employ as a modification the construction shown in Figure 10. In this the draft bar $N$ instead of being attached to the head $G'$ is bifurcated to embrace the portions $J^2$ of the sills being attached thereto by pivot pins $N'$. The arm $F$ is attached to the king-pin in the same manner as previously described but its angular position is determined by its connection to the following mechanism:

$O$ is a crank arm connected to the head $G'$ and extending rearward from the axis of the king pin $G$. The rear end of this arm $O$ is pivotally connected to lever members $O'$ and $O^2$ which at their outer ends have mounted thereon grooved rollers $O^3$ in traveling contact with flanges $J^3$ on the inclined portions $J^2$ of the sill members $J$. The lever members $O'$ and $O^2$ have also connected to their outer ends the links $O^4$ and $O^5$ which extend to the tractor and are universally pivotally attached thereto, as indicated at $O^6$. As shown, this attachment is to the outer ends of a cross-arm $O^7$ which is mounted on the bracket $K^2$ to which the draft bar $N$ is universally pivoted. The arrangement is such that whenever there is a change in the direction of movement of the tractor causing a lateral and angular movement of the bracket $K^2$ and arm $O^7$, this will draw one of the lever arms $O'$, $O^2$ forward on the sill member $J^2$ and will force the other lever arm backward on its sill member. This in turn will permit the swinging of the crank arm $O$ and the angular movement of the arm $F$ with respect to the draft arm $N$ and longitudinal axis of the tractor body, so that the trailer will be steered in the same manner as with the construction previously described. In straight backing the arm $F$ is held from swinging about the axis of the king-pin $G$ as this cannot occur without a relative movement of the arms $O'$ and $O^2$ which are held from such movement by the tension of the links $O^4$ and $O^5$. If, however, the backing is not in a straight line, then the swinging of the arm $F$ and king-pin is permitted to the extent required.

Figure 14:
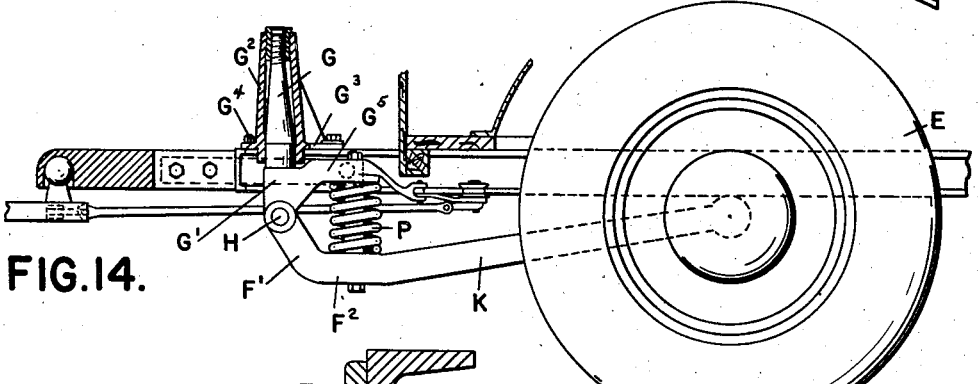
Figure 14 is a view similar to Figure 8 but showing the draft rigging of Figures 10 and 11.
Figure 9:
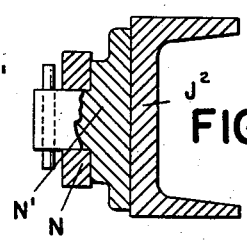
Figure 9 is a section on line 9—9 of Figure 8.
Figure 13:
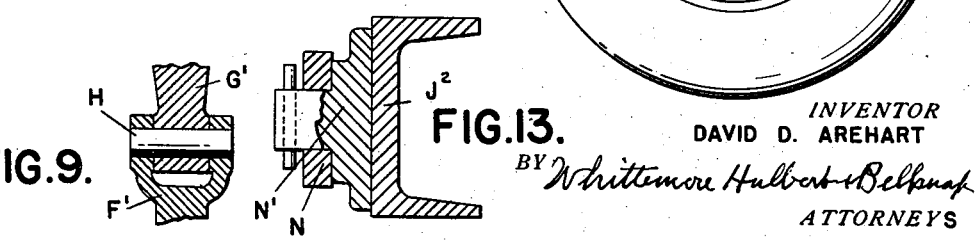
Figure 13 is a section on line 13—13 of Figure 10.

In place of the spring suspension illustrated in Figures 3, 5 and 11, I may employ as a modification the construction shown in Figures 8 and 14. In this the arm $F$ is bent downward from its point of attachment to the pin $H$, as indicated at $F'$, and then has a substantially horizontal portion $F^2$. This is arranged beneath a portion $G^5$ of the head $G'$ and between these portions is arranged a coil spring $P$. Thus downward movement of said head is yieldably resisted by this spring.

In each of the constructions shown in Figures 3, 5 and 11, the spring is in the form of a cantilever arm which is rigidly attached to the head $G'$ and at its rear end is coupled to the arm $F$. In all of the constructions the reaction of the spring is carried into the king-pin and from the latter into the bearing $G^2$ which is rigidly attached to the converging sill members $J^2$. This construction permits of using a relatively long bearing and king-pin, thereby reducing the magnitude of the radial thrust transmitted from the pin to the bearing.

Figures 15, 16:
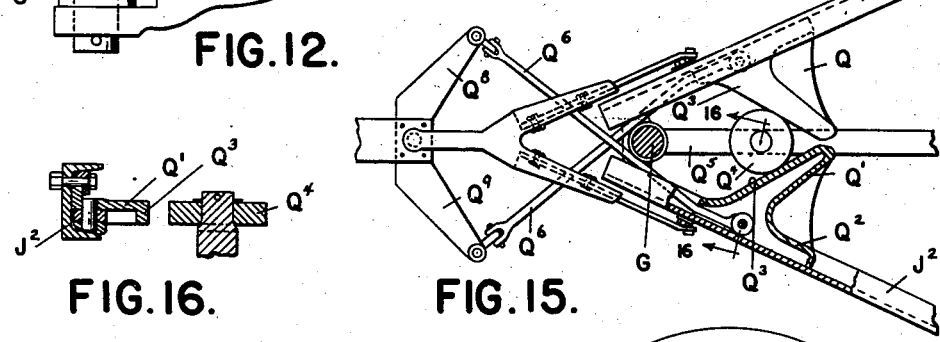
Figure 15 is a plan view of another modification of the type illustrated in Figure 10.
Figure 16 is a cross section on line 16—16 of Figure 15.

Figure 15 shows another modification of a somewhat similar type to that illustrated in Figure 10. In this the angularity of the caster wheel with respect to the trailer is positively determined by cams $Q$ and $Q'$ which slidably engage channels in the sill members $J^2$ and are actuated by links connected to the tractor. As shown, these cams have shoe portions $Q^2$ which engage the channels of the sills $J^2$ and the projecting portions form inclined tracks $Q^3$ engaging a roller $Q^4$ at the rear end of a crank arm $Q^5$ which is attached to the king-pin. Cross-links Q⁶ are pivotally attached to the members Q and Q' and extend forward therefrom through the ends of the channels with their forward ends pivotally attached to arms Q⁸ and Q⁹ rigid with the tractor and on opposite sides of the draft bar connecting the same to the trailer. Thus where there is any change in direction of the tractor one or the other of the cams Q and Q' will be moved forward and through engagement with the roller Q⁴ will swing the crank arm Q⁵, thereby correspondingly changing the angle of the caster wheel. Thus this construction as well as the construction shown in Figure 10 will positively determine the angular relation of the caster wheel to the trailer through the operation of non-yielding elements connecting the same with the tractor.

What I claim as my invention is:

1. The combination with a trailer, of a caster wheel forming a support therefor and including a king-pin pivotally engaging said trailer having a head at its lower end, an arm extending rearward from said king-pin, a horizontal pivotal connection between the forward end of said arm and said head permitting swinging movement in a vertical plane, a wheel supporting the rear end of said arm, and resilient means interposed between said head and arm for yieldably supporting the load; and a draft connection pivotally attached to said head to permit swinging in a vertical plane while preventing relative movement in a horizontal plane.

2. The combination with a trailer, of a caster wheel forming a support therefor and including a king-pin pivotally engaging said trailer having a head at its lower end, an arm extending rearward from said king-pin, a horizontal pivotal connection between the forward end of said arm and said head permitting swinging movement in a vertical plane, a wheel supporting the rear end of said arm, and resilient means interposed between said head and arm for yieldably supporting the load; a draft connection pivotally attached to said head to permit swinging in a vertical plane while preventing relative movement in a horizontal plane, a tractor to which the forward end of said draft connection is universally pivoted, and resilient means for yieldably holding said draft connection in line with the direction of movement of said tractor.

3. The combination with a trailer, of a caster wheel forming a support therefor and including a king-pin pivotally engaging said trailer having a head at its lower end, an arm extending rearward from said king-pin, a horizontal pivotal connection between the forward end of said arm and said head permitting swinging movement in a vertical plane, a wheel supporting the rear end of said arm, and resilient means interposed between said head and arm for yieldably supporting the load; a draft connection pivotally attached to said head to permit swinging in a vertical plane while preventing relative movement in a horizontal plane, a tractor to which the forward end of said draft connection is universally pivoted, and means for yieldably holding said draft connection in line with the direction of movement of said tractor comprising resilient diagonal ties respectively on opposite sides of said draft connection and extending from the rear end thereof to said tractor.

4. The combination with a trailer, of supporting sills therefor having converging forwardly extending portions extending beyond the forward end of the trailer, a king-pin bearing mounted on the forward ends of said sills and extending upward therefrom, a king-pin engaging said bearing having a head at its lower end, an arm extending rearward from said king-pin pivotally attached to said head to permit swinging in a vertical plane, a wheel supporting the rear end of said arm, and resilient means interposed between said head and arm for yieldably supporting the load.

5. The combination with a trailer, of supporting sills therefor having converging forwardly extending portions extending beyond the forward end of the trailer, a king-pin bearing mounted on the forward ends of said sills and extending upward therefrom, a king-pin engaging said bearing having a head at its lower end, an arm extending rearward from said king-pin pivotally attached to said head to permit swinging in a vertical plane, a wheel supporting the rear end of said arm, resilient means interposed between said head and arm for yieldably supporting the load, and a draft connection pivotally attached to said head to permit swinging in a vertical plane while maintained in fixed relation thereto in a horizontal plane.

6. The combination with a trailer, of supporting sills therefor having converging forwardly extending portions projecting beyond the forward end of the trailer body, a king-pin bearing mounted upon the projecting end portions of said sills and extending upward therefrom, a king-pin engaging said bearing and having a head at its lower end, an arm extending rearward from said king-pin and pivotally attached to said head to permit swinging in a vertical plane, a wheel supporting the rear end of said arm, and a cantilever spring secured to said head to project rearward therefrom and having its rear end attached to said arm.

7. The combination with a trailer, of supporting sills therefor having converging forwardly extending portions, a caster wheel forming a support for said trailer and including a king-pin bearing mounted at the forward ends of said sills, a king-pin engaging said bearing, an arm extending rearward from said king-pin and a wheel supporting the rear end of said arm, a tractor, a draft connection for said trailer pivotally attached to said tractor, and means for positively determining the angular relation of said caster wheel to said trailer by the angular relation of said draft connection to said tractor comprising a crank arm extending rearward from said king-pin, a pair of members having traveling engagement with said converging sill members, links connecting said traveling members with said tractor on opposite sides of the pivotal attachment to said draft connection, and means on the respective traveling members engaging the rear end of said crank arm adapted to swing the same in one direction or the other when moved forward from normal position by the draft of their respective links.

8. The combination with a trailer, of supporting sills therefor having converging forwardly extending portions, a caster wheel forming a support for said trailer and including a king-pin bearing mounted at the forward ends of said sills, a king-pin engaging said bearing, an arm extending rearward from said king-pin and a wheel supporting the rear end of said arm, a tractor, a draft connection for said trailer pivotally attached to said tractor, and means for positively determining the angular relation of said caster wheel to said trailer by the angular relation of said draft connection to said tractor comprising a crank arm extending rearward from said king-pin, a pair of members having traveling engagement with said converging sill members, links connecting said traveling members with said tractor on opposite sides of the pivotal attachment to said draft connection, and levers connecting the respective traveling members with the rear end of said crank arm.

9. The combination with a trailer, of supporting sills therefor having converging forwardly extending portions, a caster wheel forming a support for said trailer and including a king-pin bearing mounted at the forward ends of said sills, a king-pin engaging said bearing, an arm extending rearward from said king-pin and a wheel supporting the rear end of said arm, a tractor, a draft connection for said trailer pivotally attached to said tractor, and means for positively determining the angular relation of said caster wheel to said trailer by the angular relation of said draft connection to said tractor comprising a crank arm extending rearward from said king-pin, a pair of members having traveling engagement with said converging sill members, links connecting said traveling members with said tractor on opposite sides of the pivotal attachment to said draft connection, a roller on the rear end of said crank arm and cam tracks on the respective traveling members for engaging said roller.

DAVID D. AREHART.